United States Patent
Zhao et al.

(10) Patent No.: US 11,087,439 B2
(45) Date of Patent: Aug. 10, 2021

(54) HYBRID FRAMEWORK-BASED IMAGE BIT-DEPTH EXPANSION METHOD AND DEVICE

(71) Applicant: PEKING UNIVERSITY SHENZHEN GRADUATE SCHOOL, Shenzhen (CN)

(72) Inventors: Yang Zhao, Shenzhen (CN); Ronggang Wang, Shenzhen (CN); Wen Gao, Shenzhen (CN); Zhenyu Wang, Shenzhen (CN); Wenmin Wang, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 70 days.

(21) Appl. No.: 16/640,511

(22) PCT Filed: May 18, 2018

(86) PCT No.: PCT/CN2018/087424
§ 371 (c)(1),
(2) Date: Feb. 20, 2020

(87) PCT Pub. No.: WO2019/037487
PCT Pub. Date: Feb. 28, 2019

(65) Prior Publication Data
US 2020/0364833 A1    Nov. 19, 2020

(30) Foreign Application Priority Data

Aug. 21, 2017    (CN) .......................... 201710717259.1

(51) Int. Cl.
*G06T 5/00* (2006.01)
*G06T 7/11* (2017.01)

(52) U.S. Cl.
CPC .............. *G06T 5/001* (2013.01); *G06T 5/008* (2013.01); *G06T 7/11* (2017.01);
(Continued)

(58) Field of Classification Search
CPC . G06T 5/001; G06T 5/008; G06T 7/11; G06T 7/50; G06T 2207/10028;
(Continued)

(56) References Cited

U.S. PATENT DOCUMENTS

2016/0035069 A1* 2/2016 Min ........................ G06T 5/007
                                                      382/266
2017/0185871 A1* 6/2017 Zhang .................... G06N 3/084

FOREIGN PATENT DOCUMENTS

CN        1241748 A     1/2000
CN      106663311 A     5/2017
(Continued)

*Primary Examiner* — Kim Y Vu
*Assistant Examiner* — Francisco A Agra
(74) *Attorney, Agent, or Firm* — Miles & Stockbridge P.C.

(57) ABSTRACT

The present disclosure provides a hybrid framework-based image bit-depth expansion method and device. The invention fuses a traditional de-banding algorithm and a depth network-based learning algorithm, and can remove unnatural effects in an image flat area whilst more realistically restoring numerical information of missing bits. The method comprises the extraction of image flat areas, local adaptive pixel value adjustment-based flat area bit-depth expansion and convolutional neural network-based non-flat area bit-depth expansion. The present invention uses a learning-based method to train an effective depth network to solve the problem of realistically restoring missing bits, whilst using a simple and robust local adaptive pixel value adjustment method in an flat area to effectively inhibit unnatural effects (Continued)

in the flat area such as banding, a ringing and flat noise, improving subjective visual quality of the flat area.

7 Claims, 1 Drawing Sheet

(52) U.S. Cl.
CPC .............. *G06T 2207/20012* (2013.01); *G06T 2207/20081* (2013.01); *G06T 2207/20084* (2013.01)

(58) Field of Classification Search
CPC . G06T 2207/20012; G06T 2207/20081; G06T 2207/20084; H04N 1/58; H04N 1/6072; G06N 3/02
See application file for complete search history.

(56) References Cited

FOREIGN PATENT DOCUMENTS

| | | |
|---|---|---|
| CN | 107481278 A | 12/2017 |
| EP | 1094420 A2 | 4/2001 |

* cited by examiner

HYBRID FRAMEWORK-BASED IMAGE BIT-DEPTH EXPANSION METHOD AND DEVICE

CROSS-REFERENCE TO RELATED APPLICATIONS

The present application is a national stage filing under 35 U.S.C. § 371 of PCT/CN2018/087424, filed on May 18, 2018 which claims priority to CN Application No. 201710717259.1 filed on Aug. 21, 2017. The applications are incorporated herein by reference in their entirety.

FIELD

The present disclosure generally belongs to a field of image processing technology, and relates to image bit-depth expansion and enhancement processing technology, specifically relates to a hybrid framework-based image bit-depth expansion method and device, wherein the hybrid framework fuses adaptive pixel value adjustment technology and convolutional neural network-based reconstruction technology.

BACKGROUND

Image bit-depth expansion refers to restoring high bit-depth images from low bit-depth images. The bit-depth of an image is the number of binary bits of the value of each pixel in the image. For example, pixel value ranges from 0 to 255 in an 8-bit-depth image. The higher the bit-depth of the image, the more delicate the brightness change can be reflected. The bit-depth that human eyes can perceive ranges from 12 to 14 bits, so we can recognize that the image seen from an 8-bit display is different from the picture seen with the eyes, and one important reason is the insufficient bit-depth of the image and image display. With continuous development of image display technology, image bit-depth expansion has potential wide application prospects in image display, image editing, high-definition television and other fields.

The prior most classical image bit-depth expansion algorithm includes: Zero Padding method, which improves bit-depth by shifting image pixel values by bits, and all new bits generated by shifting are set as 0; Ideal Gain method, which amplifies low bit-depth pixel values by multiplying a bit-depth boosting factor to improve bit-depth; Bit Replication method, similar to the zero padding method, firstly perform bit shifting, but the new bits generated by shifting is obtained by replicating the previous bits. However, these classic methods may cause some unnatural effects, such as banding effect, ringing effect, and noise in flat areas.

In recent years, some bit-depth expansion methods focusing on eliminating banding effect have been proposed to reduce unnatural effects of flat areas to a certain extent. However, the prior bit-depth expansion methods are mostly traditional non-learning methods. These methods use fixation strategies to determine information of missing bits, but can hardly reconstruct true values of the missing bits. Meanwhile, these methods often lead to the loss of high-frequency details in non-flat areas when removing banding effect. It is difficult for the prior methods to restore high bit-depth images with low bit-depth images without unnatural effects and with high-frequency texture details of higher fidelity.

SUMMARY

To overcome the drawbacks in the prior technologies, the present disclosure provides a hybrid framework-based image bit-depth expansion method and device. The invention fuses a traditional de-banding algorithm and a depth network-based learning algorithm, and can well remove unnatural effects of image flat areas whilst more realistically restore numerical information of missing bits.

The technical solution provided by the present invention is:

A hybrid framework-based image bit-depth expansion method, comprising: extraction of image flat areas, local adaptive pixel value adjustment-based flat area bit-depth expansion and convolutional neural network-based non-flat area bit-depth expansion; specifically comprises the following steps:

The first step, extract flat areas of an image, dividing the image into flat areas and texture (non-flat) areas;

Extract flat areas of the image according to the degree of local numerical change, and divide the image into flat areas and texture (non-flat) areas, so as to facilitate subsequent processing for the flat areas and the texture (non-flat) areas separately; specifically, measure the degree of local numerical change using local average pixel value difference information, and the calculation method is as shown in formula 1:

$$D = 1/P \sum_{i=1}^{P} (g_i - \bar{g}) \quad \text{(Formula 1)}$$

Wherein, P is the total number of pixels in the local, $g_i$ ($i=1, 2, \ldots, P$) is a pixel in the local, $\bar{g}$ is a local average pixel value. After calculating every local pixel value difference D, an average local pixel value difference $\bar{D}$ of the entire image can be obtained. Since local pixel values of the flat areas change gradually, that is, the value of the difference D of an flat area is small, by introducing a coefficient $\lambda$, if the local area satisfies $D \leq \lambda \bar{D}$, the local area is a flat area, otherwise it is a non-flat area. The coefficient $\lambda$ ranges from 0.1 to 0.2.

The second step, flat area bit-depth expansion process based on local adaptive pixel value adjustment eliminates unnatural effects in flat areas of a low bit-depth image.

To eliminate unnatural effects in flat areas of the low bit-depth image, firstly determine a bit-expanded pixel (may also be called as a central pixel) that differs from a neighboring pixel value by 1, and then adaptively adjust the value of the bit-expanded pixel according to the bit-depth information of the pixels around the bit-expanded pixel to make the bit-expand more natural and to eliminate unnatural effects such as banding effect.

In flat areas of an image, the present invention uses a method based on local adaptive pixel value adjustment, to eliminate unnatural effects such as banding effect and noise in flat areas of the low bit-depth image. Assuming that an input is a low-bit-depth image Y with a bit-depth of l-bits, and a high bit-depth image X obtained after bit-depth expansion has a bit-depth of h-bits.

Because banding effect of the flat areas appear at a pixel with a bit value difference of 1, a pixel $g_c$ satisfying $|g_i - g_c| = 1$ is referred to as a contour pixel, wherein $g_i$ is a neighboring pixel of the contour pixel $g_c$. In the present invention, 8 pixels adjacent to a pixel are used as its neighboring pixels.

For each contour pixel, a boosting factor $\sigma+$ and an inhibitor factor $\sigma-$ thereof can be calculated by Formula 2 and Formula 3, respectively:

$$\sigma_+ = \frac{1}{8} \sum_{i=1}^{8} S(g_i - g_c = 1), \; S(x) = \begin{cases} 1, & \text{if } x \text{ is true} \\ 0, & \text{if } x \text{ is false} \end{cases} \quad \text{(Formula 2)}$$

-continued $$\sigma_- = \frac{1}{8}\sum_{i=1}^{8} S(g_i - g_c = -1), S(x) = \begin{cases} 1, \text{ if } x \text{ is true} \\ 0, \text{ if } x \text{ is false} \end{cases}$$ (Formula 3)

Then, the pixel value of the contour pixel after bit-depth promotion can be obtained by Formula 4:

$$g_c^* = ZP(g_c) + \alpha(\sigma_+ - \sigma_-)2^{h-l}$$ (Formula 4)

Wherein, ZP ($g_c$) uses a traditional zero padding method for the pixel value $g_c$ to promote the bit-depth, $\alpha$ is an adjustment value parameter, and the default value of $\alpha$ is 0.125, and a can be adjusted to increase or decrease the degree of denoising.

The third step, bit-depth expansion based on a convolutional neural network for non-flat areas.

First, a large number of low bit-depth images and corresponding high bit-depth images are used to train a convolutional neural network learned with amplified residual, then use the trained convolutional neural network to reconstruct more accurate numerical information of missing bits.

The present invention uses a convolutional neural network learned with amplified residual to learn missing bit-depth reconstruction of an image. In the bit-depth expansion, since the missing bits and the added bits are both the last bits, the magnitude of the missing bits is small. In order to effectively train the network to reconstruct the missing bit information, during the training process of the depth network, the present invention uses a low bit-depth image Y as an input, and takes the value β(X−Y) as the ground truth value after the residual (X−Y) of the corresponding high bit-depth image X and Y is amplified by the factor β.

For the input Y, the reconstruction result of the convolutional neural network F is defined as F(Y), and the final reconstructed high bit-depth image is expressed as Formula 5:

$$X^* = Y + \frac{F(Y)}{\beta}$$ (Formula 5)

Wherein, $$\beta = \frac{2^h - 1}{2^{h-l} - 1}; X^*$$

is the final reconstructed high bit-depth image.

The adaptive pixel value adjustment method can better suppress unnatural effects in flat areas, but it will introduce blurring of non-flat areas and further lose high frequency detail information; the method based on a convolutional neural network can more accurately restore missing bit values, but the subjective quality of flat areas is still affected by banding effect and noise. By using different methods for flat and non-flat areas, the result based on adaptive pixel adjustment method is used in flat areas, and the result reconstructed by using convolutional neural networks is used in non-flat texture areas, and finally a high bit-depth image is obtained, thereby achieving an technical effect of combining advantages of the above two methods.

The invention further provides a hybrid framework-based image bit-depth expansion device, as shown in FIG. 1, the device comprises three modules, i.e., an image flat area extraction module, a local adaptive pixel value adjustment-based flat area bit-depth expansion module, and a convolutional neural network-based non-flat area bit-depth expansion module.

The image flat area extraction module: for the bit-depth expansion problem, the main goal in the flat areas is to eliminate unnatural effects such as banding effect and to improve visual quality, and the main goal in the non-flat area is to restore high-fidelity high-frequency details as much as possible. Therefore, firstly, we use the local average pixel value difference information to extract flat areas of the image, and divide the image into flat areas and textured (non-flat) areas so as to process them separately.

The local adaptive pixel value adjustment-based flat area bit-depth expansion module: to eliminate unnatural effects in flat areas of the low bit-depth image, firstly determine a bit-expanded pixel that differs from a neighboring pixel value by 1, and then adaptively adjust the value of the bit-expanded pixel according to the bit-depth information of the pixels around the bit-expanded pixel to make the bit-expand more natural and to eliminate unnatural effects such as banding effect.

The convolutional neural network-based non-flat area bit-depth expansion module: in the process of reducing the image bit-depth, the numerical information of the discarded bits will be lost, therefore, restoring the numerical values of these bits is an ill-conditioned problem, and traditional methods for bit-depth expansion are mostly based on simple strategies, lacking the use of effective learning-based reconstruction algorithms. First, a large number of low bit-depth images and corresponding high bit-depth images are used to train a convolutional neural network learned with amplified residual, then, use the trained convolutional neural network to reconstruct more accurate numerical information of missing bits.

Compared with the prior art, the present disclosure has the following beneficial effects:

Prior image bit-depth expansion methods are mostly based on traditional methods that focusing on how to eliminate banding effect of a flat area, and can hardly solve the technical problem of how to restore missing bits with high fidelity. The invention provides a hybrid framework-based image bit-depth expansion method and device, by fusing a traditional de-banding algorithm and a depth network-based learning algorithm, unnatural effects of image flat area can be well removed, and at the same time, numerical information of missing bits can be more realistically restored.

The present invention uses a learning-based method to solve the ill-conditioned problem of realistically restoring missing bits by training an effective deep network. Meanwhile, for flat areas, the present invention uses a simple and robust method of local adaptive pixel value adjustment, which can effectively suppress unnatural effects such as banding effect, ringing effect, and noise in flat areas, so as to improve subjective visual quality of the flat area.

Wherein, the upper left image is a schematic representation of the location of the selected flat area in the image, and the results of the bit-depth expansion of the image flat area using different methods are: (a) a zero expansion method, (b) a bit replication method, and (c) an ideal gain method, (d) the method of the present invention, and (e) the real image.

DETAILED DESCRIPTION OF EMBODIMENTS

Hereinafter, the present disclosure is further described through the embodiments, but the scope of the present disclosure is not limited in any manner.

The invention provides a hybrid framework-based image bit-depth expansion method, and by fusing a traditional de-banding algorithm and a depth network-based learning algorithm, the method can well remove unnatural effects of image flat areas whilst more realistically restore numerical information of missing bits.

Figure 1:
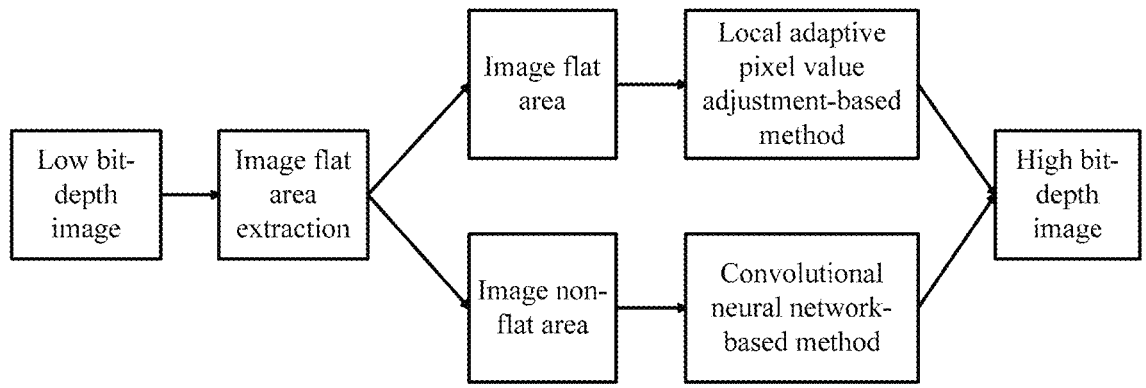
FIG. 1 is a flowchart of the present disclosure.

FIG. 1 shows the flow of the method of the present invention, comprising: extraction of image flat areas, local adaptive pixel value adjustment-based flat area bit-depth expansion and convolutional neural network-based non-flat area bit-depth expansion, specifically comprises the following steps:

The first step, extraction of flat areas of an image.

The application measures the degree of local numerical change using local average pixel value difference information, and the calculation method is as shown in formula 1:

$$D = \frac{1}{P}\sum_{i=1}^{P}(g_i - \bar{g})$$ (Formula 1)

Wherein, P is the total number of pixels in the local, $g_i$ (=1, 2, ..., P) is a pixel in the local, $\bar{g}$ is a local average pixel value. After calculating every local pixel value difference D, an average local pixel value difference $\bar{D}$ of the entire image can be obtained. Since local pixel values of the flat areas change gradually, that is, the value of the difference D of an flat area is small, by introducing a coefficient λ, if the local area satisfies D≤λ$\bar{D}$, the local area is a flat area, otherwise it is a non-flat area.

The second step, bit-depth expansion based on local adaptive pixel value adjustment for flat areas.

In flat areas of an image, the present invention uses a method based on local adaptive pixel value adjustment to eliminate unnatural effects such as banding effect and noise in flat areas in a low bit-depth image. Assuming that an input is a low-bit-depth image Y with a bit-depth of 1-bits, and a high bit-depth image X obtained after bit-depth expansion has a bit-depth of h-bits.

Because banding effect of the flat areas appear at a pixel with a bit value difference of 1, a pixel $g_c$ satisfying $|g_i - g_c| = 1$ is referred to as a contour pixel, wherein $g_i$ is a neighboring pixel of the contour pixel $g_c$. In the present invention, 8 pixels adjacent to a pixel are used as its neighboring pixels.

For each contour pixel, a boosting factor σ+ and an inhibitor factor σ− thereof can be calculated by Formula 2 and Formula 3, respectively:

$$\sigma_+ = \frac{1}{8}\sum_{i=1}^{8} S(g_i - g_c = 1), S(x) = \begin{cases} 1, \text{ if } x \text{ is true} \\ 0, \text{ if } x \text{ is false} \end{cases}$$ (Formula 2)

$$\sigma_- = \frac{1}{8}\sum_{i=1}^{8} S(g_i - g_c = -1), S(x) = \begin{cases} 1, \text{ if } x \text{ is true} \\ 0, \text{ if } x \text{ is false} \end{cases}$$ (Formula 3)

Then, the pixel value of the contour pixel after bit-depth promotion can be obtained by Formula 4:

$$g_c^* = ZP(g_c) + \alpha(\sigma_+ - \sigma_-)1^{h-l}$$ (Formula 4)

Wherein, ZP($g_c$) uses a traditional zero padding method for the pixel value $g_c$ to promote the bit-depth, α is an adjustment value parameter, and the default value of α is 0.125, and a can be adjusted to increase or decrease the degree of denoising.

The third step, bit-depth expansion based on a convolutional neural network for non-flat areas.

The present invention uses a convolutional neural network learned with amplified residual to learn reconstruction of missing bit-depth of an image. In the bit-depth expansion, since the missing bits and the added bits are both the last bits, the magnitude of the missing bits is small. In order to effectively train the network to reconstruct the missing bit information, during the training process of the depth network, the present invention uses a low bit-depth image Y as an input, and takes the value β(X−Y) as the ground truth value after the residual (X−Y) of the corresponding high bit-depth image X and Y is amplified by the factor β.

For the input Y, the reconstruction result of the convolutional neural network F is defined as F(Y), and the final reconstructed high bit-depth image is expressed as Formula 5:

$$X^* = Y + \frac{F(Y)}{\beta}$$ (Formula 5)

Wherein, $$\beta = \frac{2^h - 1}{2^{h-l} - 1}; X^*$$

is the high bit-depth image reconstructed using the convolutional neural network.

Figure 2:
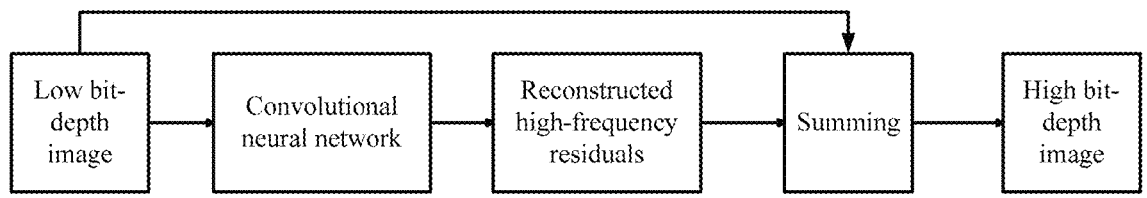
FIG. 2 is a flowchart of the convolutional neural network method used in the present invention.

The structure of the convolutional neural network used in the present invention is shown in FIG. 2, and its structure is:

a. an input layer composed of 3×3 convolution kernels, and the input layer inputs an input image and outputs 64 feature images;

b. a convolutional layer composed of 3×3 convolution kernels, outputting 64 feature images;

c. a batch normalization layer;

d. an ReLU activation function layer;

e. a convolutional layer composed of 3×3 convolution kernels, outputting 64 feature images;

f. a batch normalization layer;

g. an ReLU activation function layer;

h. a convolutional layer composed of 3×3 convolution kernels, outputting 64 feature images;

i. a batch normalization layer;

j. an ReLU activation function layer;

k. a convolutional layer composed of 1×1 convolution kernels, outputting 64 feature images;

l. a batch normalization layer;

m. an ReLU activation function layer;

n. an output layer composed of a 3×3 convolution kernels, outputting a reconstructed residual image F(Y).

The adaptive pixel value adjustment method can better suppress unnatural effects in flat areas, but it will introduce blurring of non-flat areas and further lose high frequency detail information; the method based on a convolutional neural network can more accurately restore missing bit values, but the subjective quality of flat areas is still affected by banding effect and noise. By combining advantages of the two methods, the results based on the adaptive pixel adjustment method are used in flat areas, and the results of convolutional neural network reconstruction are used in non-flat areas, and the two methods are combined to finally obtain high bit-depth images.

Table 1 shows the comparison of the peak signal-to-noise ratio (PSNR) effect of the method of the present invention and three traditional methods (Zero Padding, Bit Replication, and Ideal Gain) on several data sets during image reconstruction from 6-bits to 8-bits, and Set5, Set14, Kodak and B100 are 4 image test sets. It can be seen from numerical comparison that by using a learning method based on a convolutional neural network, the numerical information of the missing bits can be more accurately recovered, thereby restoring more realistic high-frequency details of the texture.

Table 1 Comparison of average peak signal-to-noise ratio (PSNR) of reconstruction from 6-bits to 8-bits on different test sets.

TABLE 1

|  | Zero Padding method | Bit Replication method | Ideal Gain method | Method of the present application |
|---|---|---|---|---|
| Set5 | 43.26 | 45.53 | 46.29 | 46.64 |
| Set14 | 42.87 | 45.58 | 46.18 | 46.22 |
| Kodak | 42.61 | 45.59 | 46.10 | 46.36 |
| B100 | 42.64 | 45.17 | 45.87 | 46.32 |

Figure 3:
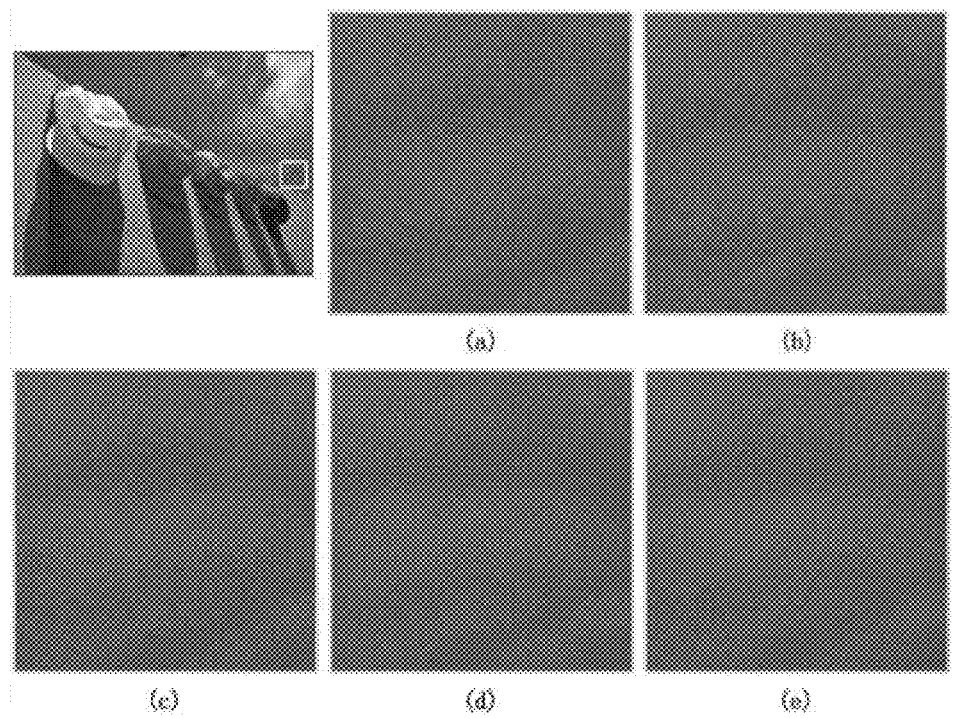
FIG. 3 is a comparison diagram of the subjective quality of reconstructed images when reconstructing images from 6-bits to 8-bits using the present invention and several prior methods.

FIG. 3 shows the comparison of subjective quality of the reconstructed image of the present invention and several prior traditional methods when reconstructing images from 6-bits to 8-bits. It can be seen that banding effect and noise of the flat areas of the image reconstructed by the method of the present invention are both well suppressed, thus improving subjective visual quality.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A hybrid framework-based image bit-depth expansion method, comprising extraction of image flat areas, local adaptive pixel value adjustment-based flat area bit-depth expansion and convolutional neural network-based non-flat area bit-depth expansion; comprising the following steps:
    the first step, extracting flat areas of an image, dividing the image into flat areas and non-flat areas;
    the second step, as for the flat areas, bit-depth expansion based on local adaptive pixel value adjustment; comprising:
        first, determining a bit-expanded pixel that differs from its neighboring pixel value;
        then, according to bit-depth information of pixels around the bit-expanded pixel, a local adaptive pixel value adjustment-based method is used to adaptively adjust the value of the bit-expanded pixel, thereby eliminating unnatural effects in flat areas of a low bit-depth image;
    the third step, as for the non-flat areas, bit-depth expansion based on a convolutional neural network; comprising:
        first, a large number of low bit-depth images and corresponding high bit-depth images are used to train a convolutional neural network learned with amplified residual;
        then, using the trained convolutional neural network to reconstruct more accurate numerical information of missing bits;
        completing a non-flat area bit-depth expansion process based on the convolutional neural network;
    through the above steps, the bit-depth expansion of the image is realized.

2. The hybrid framework-based image bit-depth expansion method of claim 1, wherein, in the first step, dividing the image into flat areas and non-flat areas comprises the following steps:
    11) measuring the degree of local numerical change using local average pixel value difference information, and the calculation method is as shown in Formula 1:

$$D = \frac{1}{P}\sum_{i=1}^{P} (g_i - \bar{g}) \quad \text{(Formula 1)}$$

wherein, D is a local pixel value difference; P is the total number of pixels in the local; $g_i$ (i=1, 2, ..., P) is a pixel in the local; is a local average pixel value;
    12) obtaining an average local pixel value difference $\bar{D}$ of the whole image according to each local pixel value difference D;
    13) local pixel values of the flat areas change gradually, that is, the value of the difference D thereof is small; a coefficient λ is introduced, and if the local area satisfies D≤λ$\bar{D}$, the local area is a flat area, otherwise it is a non-flat area.

3. The hybrid framework-based image bit-depth expansion method of claim 1, wherein the second step is to use a method based on local adaptive pixel value adjustment for the flat areas of the image to eliminate unnatural effects of the flat areas in the low bit-depth image; specifically, Assuming that an input is a low bit-depth image Y with a bit-depth of 1-bits, and a high bit-depth image X obtained after bit-depth expansion has a bit-depth of h-bits;
    banding effect of the flat areas appear at a pixel with a bit value difference of 1, and a pixel $g_c$ satisfying $|g_i - g_c| = 1$ is referred to as a contour pixel, wherein $g_i$ is a neighboring pixel of the contour pixel $g_c$; 8 pixels adjacent to a pixel are used as neighboring pixels thereof;
    for each contour pixel, a boosting factor σ+ and an inhibitor factor σ− are calculated by Formula 2 and Formula 3, respectively:

$$\sigma_+ = \frac{1}{8}\sum_{i=1}^{8} S(g_i - g_c = 1), \; S(x) = \begin{cases} 1, \text{ if } x \text{ is true} \\ 0, \text{ if } x \text{ is false} \end{cases} \quad \text{(Formula 2)}$$

-continued $$\sigma_- = \frac{1}{8}\sum_{i=1}^{8} S(g_i - g_c = -1), S(x) = \begin{cases} 1, \text{if } x \text{ is true} \\ 0, \text{if } x \text{ is false} \end{cases}$$ (Formula 3)

then, the pixel value of the contour pixel after bit-depth promotion is obtained by Formula 4:

$g_c^* = ZP(g_c) + \alpha(\sigma_+ - \sigma_-)2^{h-l}$ (Formula 4)

wherein, ZP ($g_c$) uses a zero padding method for the pixel value $g_c$ to promote the bit-depth; α is an adjustment value parameter, which can be adjusted to increase or decrease the degree of denoising.

4. The hybrid framework-based image bit-depth expansion method of claim 3, wherein, the value of the adjustment value parameter α is 0.125.

5. The hybrid framework-based image bit-depth expansion method of claim 1, wherein, in the third step, during the training of the convolutional neural network, a low bit-depth image Y is used as an input, and the residual (X−Y) of a high bit-depth image X corresponding to Y and Y is amplified by a factor β, and the value β(X−Y) is used as the ground truth value; for the input Y, the reconstruction result of the convolutional neural network F is defined as F(Y), and the final reconstructed high bit-depth image is expressed as Formula 5:

$$X^* = Y + \frac{F(Y)}{\beta}$$ (Formula 5)

wherein, $$\beta = \frac{2^h - 1}{2^{h-l} - 1};$$

is a high bit-depth image reconstructed using the convolutional neural network.

6. The hybrid framework-based image bit-depth expansion method of claim 5, wherein, the structure of the convolutional neural network includes:

a. an input layer composed of 3×3 convolution kernels, and the input layer inputs an input image and outputs 64 feature images;
b. a convolutional layer composed of 3×3 convolution kernels, outputting 64 feature images;
c. a batch normalization layer;
d. an ReLU activation function layer;
e. a convolutional layer composed of 3×3 convolution kernels, outputting 64 feature images;
f. a batch normalization layer;
g. an ReLU activation function layer;
h. a convolutional layer composed of 3×3 convolution kernels, outputting 64 feature images;
i. a batch normalization layer;
j. an ReLU activation function layer;
k. a convolutional layer composed of 1×1 convolution kernels, outputting 64 feature images;
l. a batch normalization layer;
m. an ReLU activation function layer;
n. an output layer composed of a 3×3 convolution kernels, outputting a reconstructed residual image F(Y).

7. A hybrid framework-based image bit-depth expansion device obtained by the hybrid framework-based image bit-depth expansion method of one of claims 1 to 6, comprising a processor, configured to execute the following program modules stored in a memory: an image flat area extraction module, a local adaptive pixel value adjustment-based flat area bit-depth expansion module and a convolutional neural network-based non-flat area bit-depth expansion module;

the image flat area extraction module, for dividing an image into flat areas and non-flat areas;

the local adaptive pixel value adjustment-based flat area bit-depth expansion module, for the flat areas, based on local adaptive pixel value adjustment, to eliminate unnatural effects in the flat areas of a low-bit-depth image;

the convolutional neural network-based non-flat area bit-depth expansion module, used for bit-depth expansion of non-flat areas based on convolutional neural networks.

* * * * *